United States Patent
Jegu et al.

(10) Patent No.: US 8,660,771 B2
(45) Date of Patent: Feb. 25, 2014

(54) METHOD FOR DETECTING THE OPENING OF A THRUST REVERSER FOR A JET ENGINE OF AN AIRCRAFT

(75) Inventors: Patrick Jegu, Toulouse (FR); Jacques Rosay, Toulouse (FR); Emanuele Costanzo, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 448 days.

(21) Appl. No.: 12/790,152

(22) Filed: May 28, 2010

(65) Prior Publication Data

US 2010/0312450 A1 Dec. 9, 2010

(30) Foreign Application Priority Data

Jun. 4, 2009 (FR) ..................................... 09 02691

(51) Int. Cl.
*G05D 1/00* (2006.01)
*G05D 3/00* (2006.01)
*G06F 7/00* (2006.01)
*G06F 17/00* (2006.01)

(52) U.S. Cl.
USPC ........................... 701/100; 60/226.2; 244/194

(58) Field of Classification Search
USPC ........ 701/100; 60/243, 226.1, 226.2; 244/194
See application file for complete search history.

(56) References Cited

U.S. PATENT DOCUMENTS

| 4,242,864 | A | * | 1/1981 | Cornett et al. ............... 60/226.1 |
| 4,622,808 | A | * | 11/1986 | Kenison et al. ................. 60/795 |
| RE34,388 | E | * | 9/1993 | Dubin et al. .................... 60/779 |
| 6,439,504 | B1 | | 8/2002 | Ahrendt |
| 7,493,752 | B2 | * | 2/2009 | Horswill et al. ................ 60/243 |
| 7,954,759 | B2 | * | 6/2011 | Marin Martinod ....... 244/110 B |
| 2003/0019206 | A1 | * | 1/2003 | Johnson ........................ 60/204 |
| 2003/0025515 | A1 | | 2/2003 | Mulera et al. |
| 2004/0118974 | A1 | | 6/2004 | Colotte et al. |

FOREIGN PATENT DOCUMENTS

FR 2922959 5/2009
FR 2922959 A1 * 5/2009

* cited by examiner

*Primary Examiner* — Thomas Black
*Assistant Examiner* — Isaac Smith
(74) *Attorney, Agent, or Firm* — Novak Druce Connolly Bove + Quigg LLP

(57) ABSTRACT

A method for detecting the opening of a thrust reverser for a jet engine of an aircraft is disclosed. According to the method, an operating parameter of the turbojet (1) is determined being responsive to the opening of a mobile element (2a, 2b) of the thrust reverser and reacting to such an opening by a sudden variation of the value thereof, the parameter is measured continuously and the mobile element (2a, 2b) is considered as being opened when the sudden variation is detected.

11 Claims, 3 Drawing Sheets

METHOD FOR DETECTING THE OPENING OF A THRUST REVERSER FOR A JET ENGINE OF AN AIRCRAFT

CROSS-REFERENCE TO RELATED APPLICATIONS

This application claims priority to French Patent Application 0902691, filed Jun. 4, 2009, the contents of which are incorporated herein by reference.

FIELD OF THE INVENTION

The present invention relates to a method enabling to detect the opening of at least one mobile element of a thrust reverser in an aircraft turbojet, such as a pivoting door, as well as an electronic system controlling the turbojet and implementing such a method, and an aircraft comprising such an electronic system.

BACKGROUND OF THE INVENTION

In aircrafts, the FADEC (<<Full Authority Digital Engine Control>>) electronic system controls the engine speed of the turbojet and fills the protection, diagnosis and maintenance aid function of the engine. Such an electronic system allows, more specifically, to determine the maximum operating speed of the engine for which the airplane remains controllable with at least one pivoting door of the thrust reverser being opened. Indeed, the opening of an reverser pivoting door impacts the controllability of the aircraft, the thrust of the engine being suddenly decreased.

Different devices for detecting the closure and the latching of pivoting doors in a thrust reverser generally using electric contactors are already known.

The FADEC electronic system connected to such detection devices receives signals indicating the closure and the latching of pivoting doors in the thrust reverser. When it no longer receives such signals, the pivoting door is in the opening position and the FADEC electronic system modifies the operating speed of the engine.

Adapting the engine speed by the FADEC electronic system should only be implemented when it is indispensable for maintaining the controllability of the aircraft, this means that the opening of the pivoting door of the thrust reverser should be proved.

In particular, should an untimely, that it to say, not requested by the pilot, opening be detected, it would then be advantageous to be able to validate the detection of the current devices.

Furthermore, in cases of breakdowns or malfunctions of such detection devices, it would be useful to obtain auxiliary information relating to the closure and the opening states of the thrust reverser.

SUMMARY OF THE INVENTION

The present invention aims at meeting such requirements, and relates to a method being adapted for detecting the opening of at least one mobile element of a thrust reverser in an aircraft turbojet, and that could be applied to validating information emitted by the detection devices.

To this end, the method according to this invention is remarkable in that:
an operating parameter of the turbojet is determined, responsive to the opening of said mobile element and reacting to the latter by a sudden variation of the value thereof;
said operating parameter is measured continuously, and said mobile element is considered as being opened when said sudden variation is detected.

When the method is applied to a turbojet comprising a usual detection system indicating, continuously, by means of an electric signal, the closure and the latching of at least one mobile element of the reverser, it comprises validating the detection of the opening of said mobile element when, in addition to the lack of reception of the electric signal indicating the closure and the latching of the reverser, said sudden variation of the operating parameter is detected.

In a first embodiment of the method, the operating parameter of the engine is the real rotation speed of the blowing unit, and the opening of the mobile element of the reverser is detected as soon as the increase of the value of real rotation speed with respect to the value of the requested rotation speed exceeds a determined threshold.

In a second embodiment of the method, the operating parameter of the engine is the time variation of the static pressure at the outlet of the high pressure compressor, and the opening of the mobile element of the reverser is detected as soon as the value of the time variation of the static pressure exceeds a determined threshold.

Naturally, it results from the foregoing that the present invention further relates to a FADEC type electronic system controlling the turbojet, wherein the above mentioned method and an aircraft comprising such a FADEC type electronic system are implemented.

BRIEF DESCRIPTION OF THE DRAWINGS

The figures of the appended drawing will better explain how this invention could be implemented. In these figures like reference numerals relate to like components.

DETAILED DESCRIPTION

Figure 1:
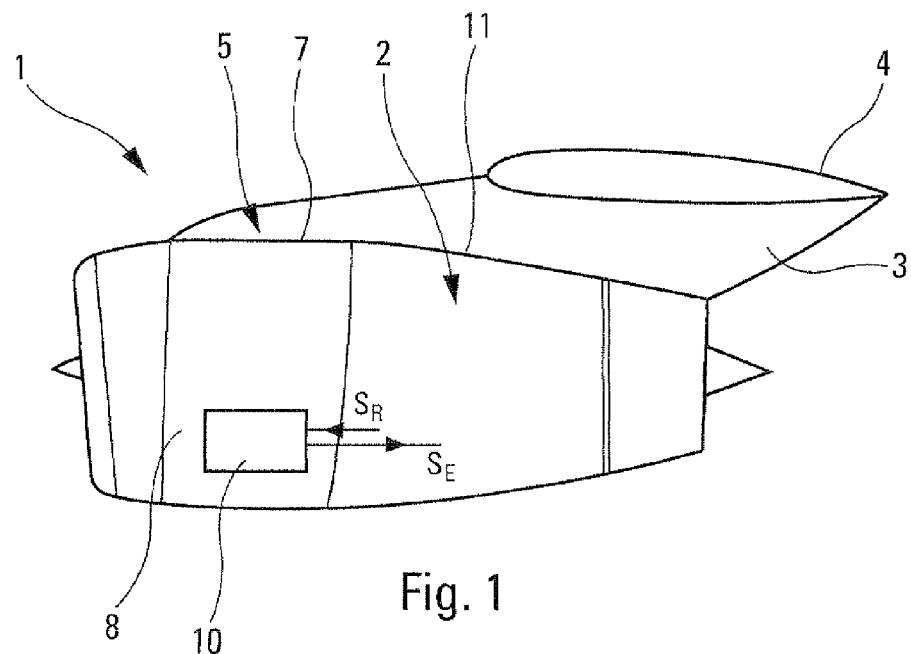
FIG. 1 schematically shows, in a side view, a double flow turbojet fastened by means of a pole on an aircraft wing.
Figure 2:
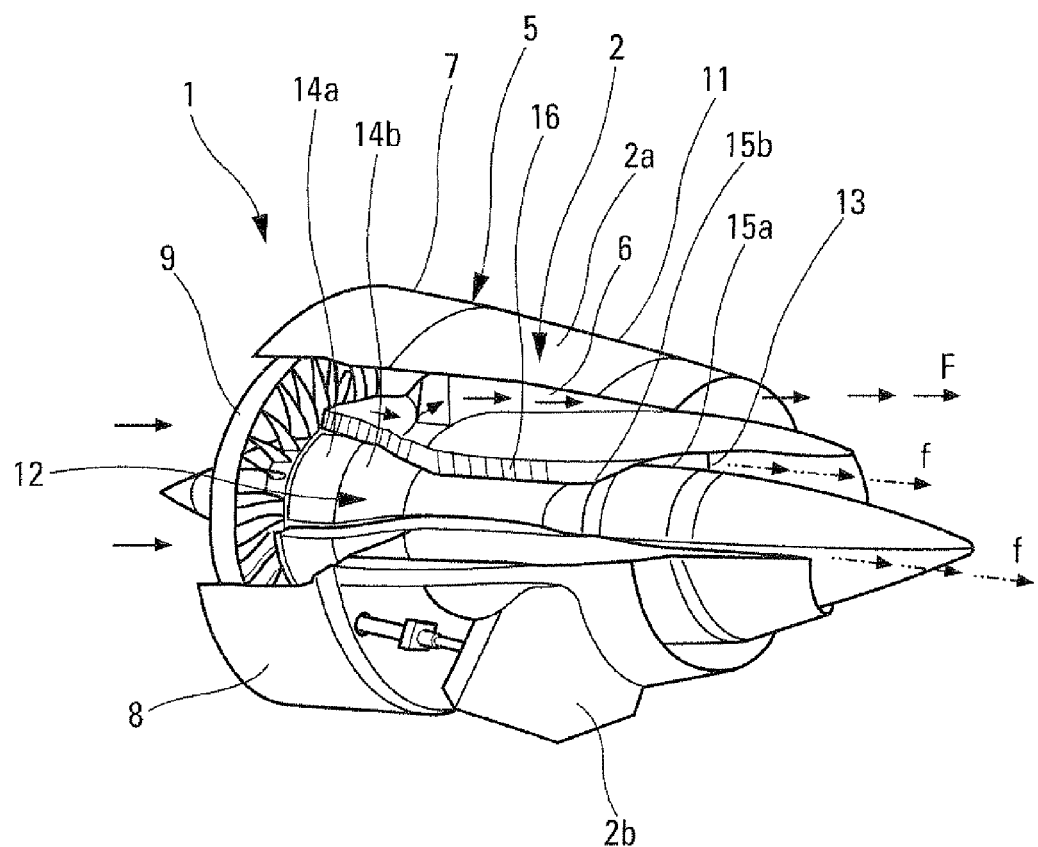
FIG. 2 schematically illustrates, in an exploded perspective view, the double flow turbojet of FIG. 1.

The double flow turbojet 1 shown on FIGS. 1 and 2 comprises a thrust reverser 2 with pivoting doors 2a and 2b.

The double flow turbojet 1 is fastened by means of a pole 3 to an aircraft wing 4. It comprises a cradle 5 having an upstream part 7 and a downstream part 11. The upstream part 7 has a side hood 8 wherein there are housed a blowing unit 9 and a FADEC electronic system 10, steering the engine speed of the double flow turbojet 1 by emitted Se and received Sr signals. The downstream part 11 is provided with the thrust reverser 2 with pivoting doors 2a and 2b.

The interior of the cradle 5 of the double flow turbojet 1 described on FIG. 2 comprises the blowing unit 9, a central generator 12 emitting, through the outlet port thereof 13, a hot flow f, and the diversion channel 6 surrounding the central generator 12 and through which a cold flow F is circulated, coming from the blowing unit 9. The central generator 12 comprises, as known, a low pressure compressor 14a, a high pressure compressor 14b, a low pressure turbine 15a, a high pressure turbine 15b and a combustion chamber 16.

The pivoting door 2a is shown in a folded position wherein it is part of the fairing of the turbojet 1 while the other pivoting door 2b is shown in an extended position.

In order to ensure the doors 2a and 2b are closed, the electronic system 10 receives from known detection devices, such as electric contactors, signals indicating that the pivoting doors 2a and 2b are closed and latched.

If the opening of at least one pivoting door 2b of the thrust reverser 2 occurs in flight or upon a take off, and if the latter is not generated by a request from the pilot, but it is triggered as a result of a malfunction of the known closure and latching means of the reverser 2, the engine speed is not decreased by the electronic system 10 at the time where the event occurs. The engine speed corresponds to the flight conditions of the aircraft established by the electronic system 10 before the opening of the pivoting door 2b.

The first embodiment of the method according to this invention allows the opening of the pivoting door 2b to be detected for a quite high air flow rate circulating across the turbojet 1 before the opening, corresponding to an average to high velocity of the aircraft.

Figure 3:
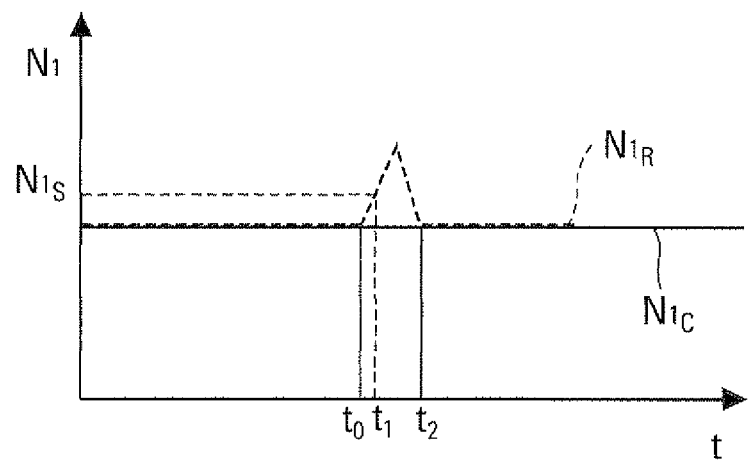
FIG. 3 is a diagram illustrating the rotation speed NI of the blowing unit of the double flow turbojet as a function of time.

After the opening of the pivoting door 2b, the air flow rate circulating across the blowing unit 9 suddenly drops and, thus the aerodynamic load of the blowing unit 9 suddenly drops. The real velocity N1r of the blowing unit 9 then accelerates as a result of the decrease of the stress exerted by the air flow on the blowing unit 9. An increase of the real velocity N1r of the blowing unit 9 is thus experimentally observed with respect to the velocity N2c requested by the electronic system 10. As illustrated on the diagram on FIG. 3, such increase is characterized by a peak between the times t0 and t2 respectively corresponding to the opening and the closure of the pivoting door 2b.

Thus, in this first embodiment, the method according to this invention comprises measuring continuously the value of the real velocity N1r, comparing the value of the real velocity N1r to the value of the velocity N1c requested by the electronic system 10 and detecting the opening of the pivoting door 2b of the reverser 2 if the comparison between the real velocity N1r and the requested velocity N1c exceeds a predetermined threshold. For example, on FIG. 3, the threshold is exceeded for N1s at time t1. The threshold corresponds to given conditions of velocity, temperature and pressure.

The second embodiment of the method according to this invention allows the opening of the pivoting door 2b of the thrust reverser 2 to be detected for a low air flow rate, circulating across the double flow turbojet 1 before the opening. In such a case, the air flow circulating across the central generator 12 emitting a hot flow could be inverted and a pumping phenomenon of the low pressure compressor is observed.

The pumping phenomenon at the low pressure compressor 14a is propagated to the high pressure compressor 14b.

Figure 4:
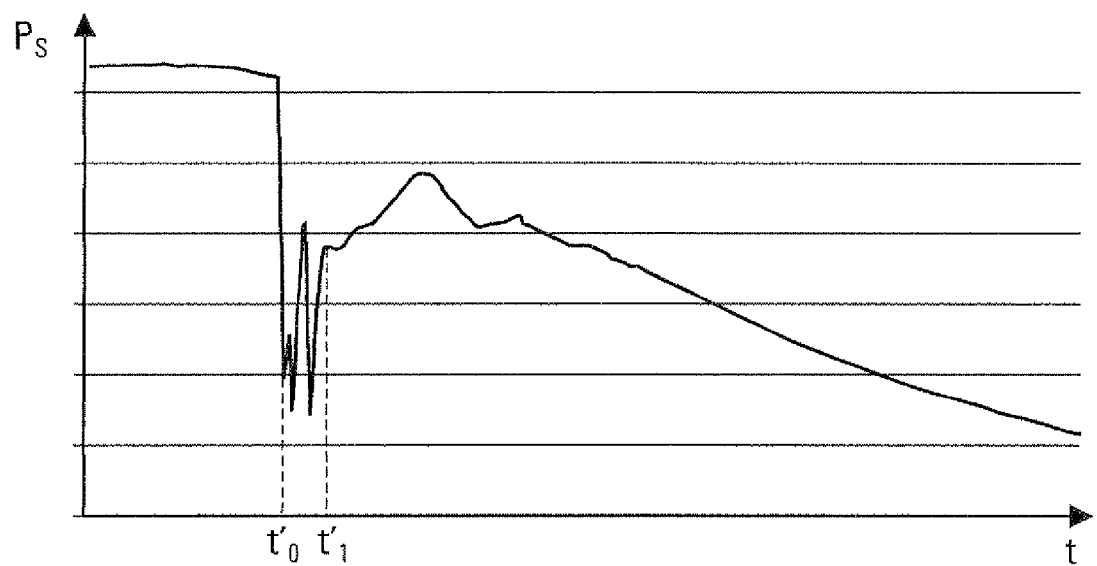
FIG. 4 is a diagram illustrating the static pressure Ps at the outlet of the high pressure compressor as a function of time.

In the case of the stall of the high pressure compressor 14b, the variation of the real velocity N1r with respect to the requested velocity N1e is not satisfactory for making up a valid detection of the opening of the pivoting door 2b in the thrust reverser 2 by the electronic system 10. On the other hand, the static pressure Ps at the outlet of the high pressure compressor 14b suddenly oscillates, as illustrated on FIG. 4 between the times t'0 and t'1 respectively corresponding to the opening and to the closure of the pivoting door 2b. Such an oscillation is sufficiently different from the variations of the static pressure Ps observed for the nominal engine operating speeds for making up a valid detection of the opening of the pivoting door 2b in the thrust reverser 2.

Thus, in this second embodiment, the method according to this invention comprises measuring continuously the variation as a function of the time of the static pressure PS, comparing the value of the variation to a predetermined threshold selected as being characteristic of the stall, and detecting the opening of the pivoting door 2b of the thrust reverser 2 as soon as the value of the variation of the static pressure exceeds the threshold. The threshold corresponds to given conditions of velocity, temperature and pressure.

The static pressure could be replaced by other operating parameters of the turbojet 1 such as the temperature at the outlet of the high pressure compressor or the velocity N2 of the high pressure stage.

Figure 5:
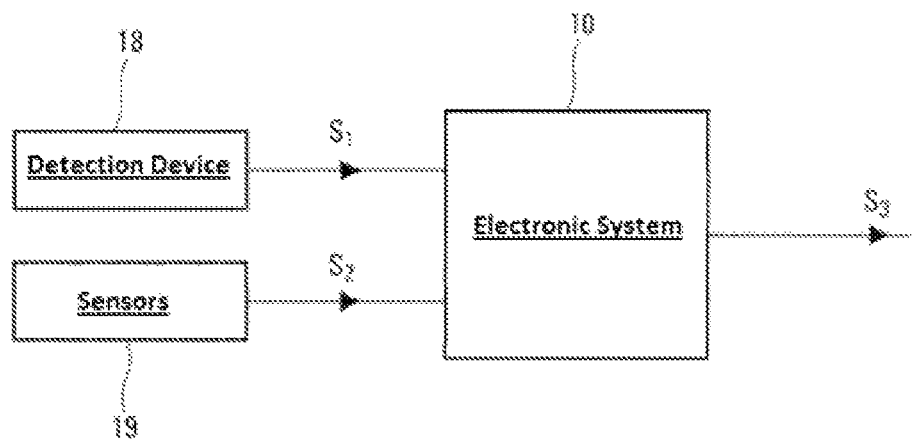
FIG. 5 illustrates a preferred application of the method according to the invention.

Advantageously, in a preferred application of the method according to this invention and illustrated on FIG. 5, the detection of the opening of the pivoting door 2b is only validated by a validation device 17 located in the electronic system 10 when both following conditions are simultaneously met:
 the electric signal S1 sent by a known detection device 18 comprising electric contactors and indicating the closure and the latching of the reverser 2 is not longer received by the validation device 17; and
 a sudden variation of the operating parameter Ni or Ps of the double flow turbojet 1 has been detected by sensors 19 and has been transmitted in the form of a signal S2 to the validation device 17.

The validation device 17 delivers at the outlet a validation signal S3 for the detection of the opening of said pivoting door 2b when it only receives the signal S2.

The method does not require adding any new device, as it uses the on-board existing systems such as the FADEC electronic system and the sensors for measuring operation magnitudes of the double flow turbojet, including, for example, pressure, velocity, temperature.

Although on figures, there are only shown pivoting door reversers, it is obvious that the present invention could be implemented by reversers of any other type, and including sliding door reversers.

The invention claimed is:

1. A method for detecting the opening of at least one mobile element of a thrust reverser in an aircraft turbojet, the method comprising, via a processor:
 continuously monitoring, a signal from a detector associated with the at least one mobile element,
  wherein reception of the signal indicates closure and latching of the at least one mobile element;
 continuously monitoring, an operating parameter of the aircraft turbojet
  wherein the operating parameter is dependent on an air flow in the turbojet,
  wherein the operating parameter is responsive to a position of the at least one mobile element,
 detecting, a variation in the operating parameter,
  wherein the variation exceeds a predetermined threshold;
 identifying the variation as a potential malfunction of the mobile element; and
 validating, the potential malfunction as an actual malfunction only when the potential malfunction occurs in an absence of reception of the signal that indicates closure and latching of the at least one mobile element.

2. A method according to claim 1, wherein the aircraft turbojet is a double flow turbojet comprising
 a blowing unit,
 a low pressure compressor,
 a high pressure compressor,
 a low pressure turbine and
 a high pressure turbine, wherein the operating parameter of the engine is a rotation speed of the blowing unit.

3. A method of claim 2, wherein the rotation speed of the blowing unit is requested, and
wherein an opening of the at least one mobile element is detected, as soon as an increase of the rotation speed exceeds a second predetermined threshold.

4. A method according to claim 1, wherein the aircraft turbojet is a double flux turbojet comprising
a blowing unit,
a low pressure compressor,
a low pressure turbine,
a high pressure compressor, and
a high pressure turbine,
wherein the operating parameter of the engine is a time variation of a static pressure at an outlet of the high pressure compressor.

5. A method according to claim 4, wherein an opening of the mobile element is detected as soon as a value of the time variation of the static pressure exceeds a second determined threshold.

6. An electronic system of the FADEC type controlling the engine speed of the turbojet, said electronic system implementing a method for detecting the opening of at least one mobile element of a thrust reverser in an aircraft turbojet, the method comprising:
continuously monitoring, via a processor, a signal from a detector associated with the at least one mobile element, wherein reception of the signal indicates closure and latching of the at least one mobile element;
continuously monitoring, via a processor, an operating parameter of the aircraft turbojet
wherein the operating parameter is dependent on an air flow in the turbojet,
wherein the operating parameter is responsive to a position of the at least one mobile element,
detecting, via a processor, a variation in the operating parameter,
wherein the variation exceeds a predetermined threshold;
identifying the variation as a potential malfunction of the mobile element; and
validating, via a processor, the potential malfunction as an actual malfunction only when the potential malfunction occurs in an absence of reception of the signal that indicates closure and latching of the at least one mobile element.

7. An aircraft comprising an electronic system of the FADEC type according to claim 6.

8. The method according to claim 1, wherein the at least one mobile element is selected from the group consisting of a pivoting door, and a sliding door reverser.

9. The method according to claim 1, when the variation is identified as a potential malfunction of the at least one mobile element only when the variation occurs in the absence of a pilot request for the variation.

10. The method according to claim 1, further comprising preventing a decrease in engine speed when an actual malfunction is validated.

11. The electronic system according to claim 6, wherein the method further comprises preventing the electronic system of the FADEC type to prevent the decrease in engine speed when an actual malfunction is validated.

* * * * *